Aug. 22, 1939.  H. L. McPHERSON  2,170,087
AIRPLANE INDICATOR
Filed July 31, 1936   2 Sheets-Sheet 1
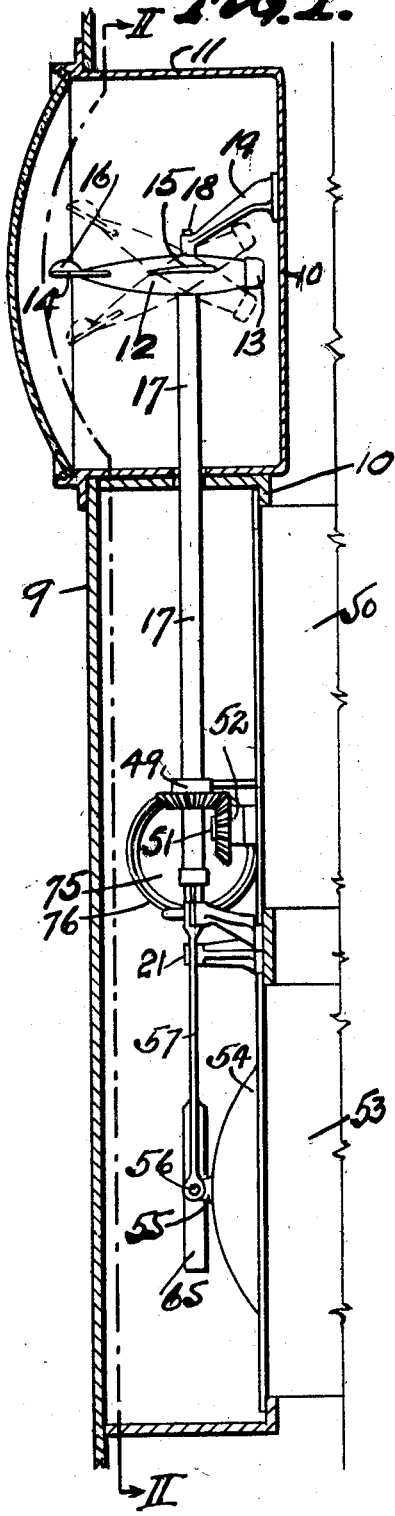
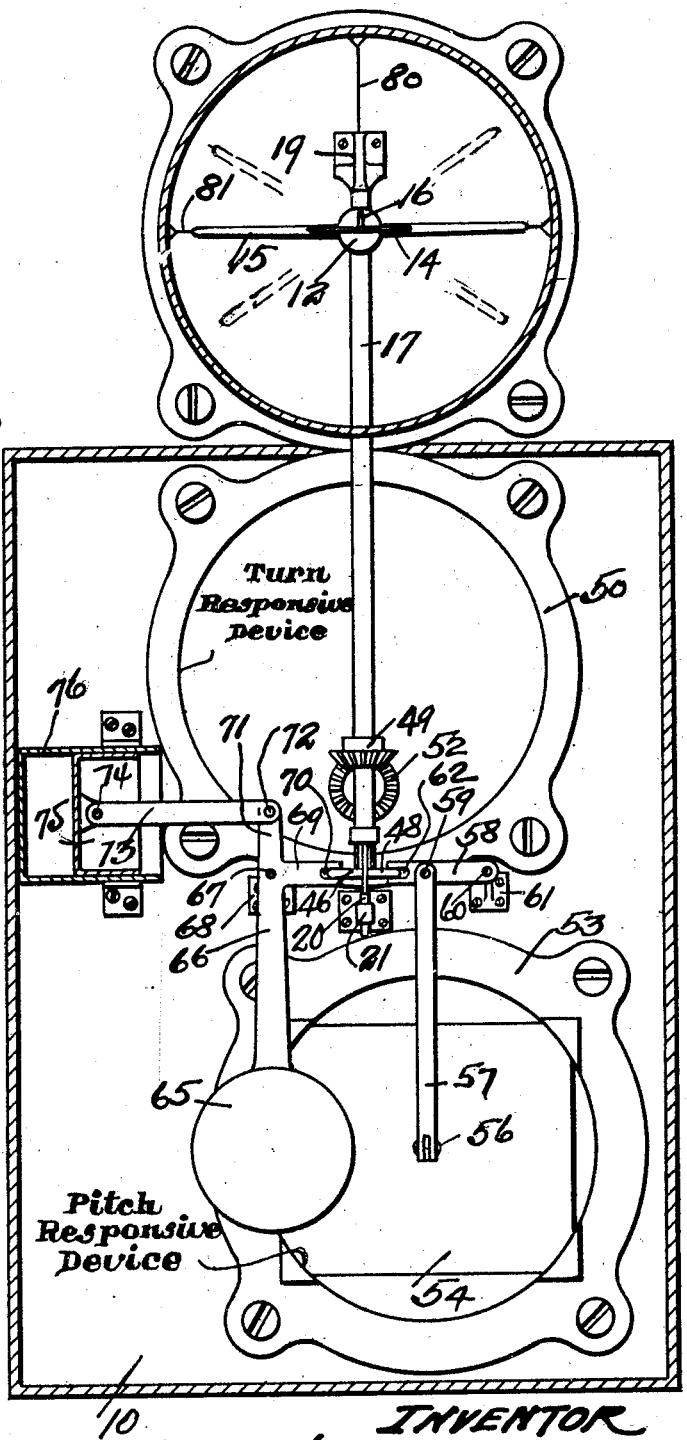
INVENTOR
Harry L. McPherson
J. H. Weatherford
Atty.

Aug. 22, 1939.   H. L. McPHERSON   2,170,087
AIRPLANE INDICATOR
Filed July 31, 1936   2 Sheets-Sheet 2
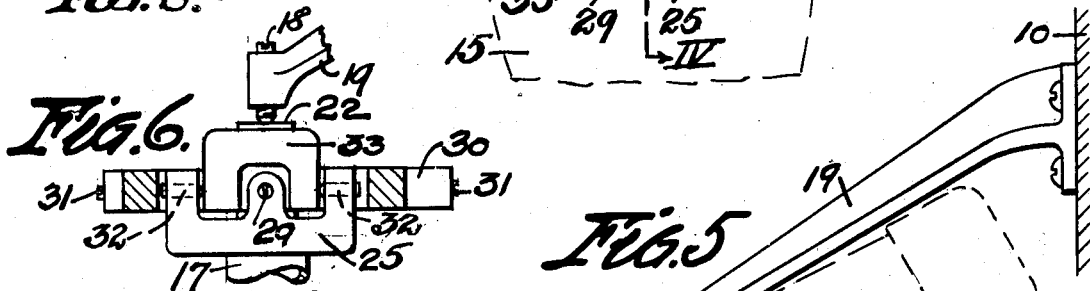

Patented Aug. 22, 1939

2,170,087

UNITED STATES PATENT OFFICE 2,170,087

AIRPLANE INDICATOR

Harry L. McPherson, Memphis, Tenn.

Application July 31, 1936, Serial No. 93,736

10 Claims. (Cl. 33—204)

This invention relates to devices for visually indicating in a single instrument the turn, pitch and bank of an airplane in flight. It has particular reference to the way in which the indicator is mounted and to the means by which the various movements are transferred to the indicator, whereby the desired indicating results are obtained.

In present day airplanes individual instruments are available which show respectively whether an airplane is turning, whether it is banking and the amount of bank, and whether it is nosing upward or downward, with the amount of such pitch. It is necessary, however, to shift the eye from one of these indicators to each of the others in order to determine just what is taking place, and ordinarily the indications on these various devices are such that they must be mentally translated, in order that the operator may be advised what to do to correct the action of the plane, should these instruments show that it is acting in undesired manner.

The present invention is not primarily directed toward any of the instrumentalities by means of which the various movements of the plane are reflected, but to the means by which the action of these instrumentalities is coordinated in a single indicator.

In flying in good weather where the earth and its objects are visible, the action of the plane relative to these objects is visually observable; in foggy or cloudy weather, however, where the earth is obscured, the operator can not visually determine just what is taking place, and, as is well known, also immediately loses all idea in regard thereto.

A visual indicator of the present type will maintain a sense of security in such cases, which will go far toward eliminating the uncertainty and even panic incident to blind flying.

Among the objects of the present invention are:

To provide datum lines and a visual indicator which directly pictures to the operator the position and movement of the plane relative to the earth in exactly the same way that he would picture them were the earth visible, and enables him in blind flying, to make use of those reactions, which have become second nature to him in visual flying.

To provide means by which the indicator of such an instrument is universally mounted; and To provide means by which turning, banking and pitch movement of the plane are transferred to and coordinated in such an indicator.

The means by which the foregoing and other objects are accomplished and the method of their accomplishment will readily be understood from the following specification on reference to the accompanying drawings, in which,—

Fig. 1 is a side elevation of the indicator and its movement coordinating instrumentalities, the casing of the instrument being shown in section.

Fig. 2 is a corresponding front elevation of the indicator and these various instrumentalities.

Fig. 3 is a sectional plan very greatly enlarged over the natural size, taken on the line III—III of Fig 5, showing the indicator mounting, the indicator itself being shown in dash lines.

Fig. 4 is a transverse section of the mounting taken on the line IV—IV of Fig. 3.

Fig. 5 is a sectional elevation taken on the line V—V of Fig. 3.

Fig. 6 is a sectional elevation taken on the line VI—VI of Fig. 3.

Fig. 7 is a fragmentary sectional plan taken on the line VII—VII of Fig. 5.

Fig. 8 is a perspective view of a rocker member with the pivot and rocker pins in place.

Fig. 9 is a corresponding perspective of an additional member which fits into the rocker, this view in addition to an actuating pin, and a journal pin, showing the related pivot pins on which it is hinged.

Referring now to the drawings in which the various parts are indicated by numerals, 9 is the instrument board of an airplane, 10 an auxiliary supporting board, and 11 the casing or housing enclosing an indicator 12, which indicator preferably is a miniature airplane having a nose 13, tail 14, wings 15 and fin 16. The indicator 12 is mounted on the upper end of a shaft 17, which preferably is hollow, the shaft being turnable, and the mounting of the indicator on the upper end of the tube providing for a fore and aft rocking motion, and an independent lateral rocking motion.

The upper end of the shaft is pivoted on a pin 18, which is carried by a bracket 19, and the lower end on a pivot pin 20, which is carried by a bracket 21, the details being shown in Figs. 4 and 5. The upper pin 18 engages a transverse plate 22 at the upper end of the shaft. At the lower end the shaft is slotted and a plate 23 inserted and secured, which plate extends below the shaft and provides a center for the pin 20.

Mounted around the upper end of the shaft 17 is a rocker having sides 25 and 26 and front and back ends 27, 28 respectively, forming one integral member, the sides 25 and 26 carrying transverse, alined pivot pins 29, which pivotally engage the shaft 17, thus providing a pivotal support for the rocker. Surrounding the rocker is a frame 30, to which the indicator 12 is secured. This frame carries alined pivot pins 31 at right angles to the pivot pins 29, the pins 31 pivotally engaging the front and back ends of the rocker and permitting the frame to oscillate about a fore and aft axis. 32 are alined pins which are carried by the front and back ends 27, 28 of the rocker, and which pins are laterally off-set from the pins 31 and substantially in line with the side 26 of the rocker. These pins pivotally engage opposite ends of the botom portion of a member 33, substantially L shaped in plan, the stem of the L projecting laterally across the rocker to the opposite side 25 thereof, and having a slot 34 which engages a pin 35, carried by the frame 30 and substantially in line with the rocker side 25. Near the center of the stem of the L is a boss 36, from which a pin 37 projects across the center of the tube 17. Turnably mounted on the pin 37 is a member 38, which carries transverse pins 39, which are pivotally engaged by the yoke shaped upper end of a rod 40, which extends downward within and to the lower end of the shaft 17. The front end 27 of the rocker has a recess 41, across which a pin 42 is transversely disposed. The upper end of the rod 43 is pivotally mounted on this pin, and like the rod 40, the rod 43 extends downward within and to the lower end of the shaft 17. The rods 40 and 43 at the lower end of the shaft 17 lie on opposite sides of the plate 23 and pass through and beyond a cap 44 on the shaft. The lower end of the rod 40 is rigidly secured to a substantially semi-circular disk 45, which disk preferably has a somewhat enlarged annular rim 46. The rod 43 is similarly secured to a similar semi-circular disk 47, preferably having a similar rim 48. These disks 45 and 47 slidably abut the plate 23 and rotate with the shaft. They are independently movable upward or downward to raise or lower the rods 40, 43, which are respectively secured to such disks.

It will be noted that the pivotal connection between the rocker and shaft, the frame and rocker, the arm and rocker; and the pins for the rod ends all lie in the same horizontal plane and that rod thrust to accomplish movement of either rocker or frame has no effect to accomplish movement in a plane at right angles to either thereof, and that such is the preferable construction, but that deviation from such plane may be made without serious error in operation.

Also mounted on and rigidly secured to the shaft 17 is a bevel gear 49. 50 indicates the casing of a well known type of instrument, and which is known as a "turn indicator". This indicator preferably is of that type which has a shaft 51 (Fig. 1), which projects from the front end of the casing and which shaft is oscillatably responsive to the turning movement of the plane. Such an instrument is shown in Patent No. 1,842,824, issued January 26, 1932, to T. H. Colvin et al. 52 is a bevel gear which is rigidly secured on the shaft 51 in lieu of the usual indicating device carried by said shaft. The gear 52 meshes with and is adapted to turn the gear 49 and the shaft 17, to which such gear is attached.

53 indicates the casing of a pitch indicator of any desirable type, preferably gyroscopically controlled. This instrument may be of the type which has a member 54 oscillatable about a horizontal axis, and such as is shown in Patent No. 1,324,482, issued December 9, 1919 to M. M. Titterington. 55 is a lug which I rigidly secure to this member. Pivotally attached to this lug 55, as by a pin 56, is an arm 57, which extends vertically upward therefrom and is pivotally secured to a horizontally disposed arm 58, as by a pin 59. One end of the arm 58 is attached, as by a pivot pin 60, to a bracket 61, secured to the board 10, the opposite ends of the arm 58 having a slot 62 therein, so disposed as to engage the rim 48 of the disk 47.

65 is a pendulum having a supporting arm 66, which is pivotally mounted, as through a pin 67, on a bracket 68 secured to the board 10. Integral with and extending substantially at right angles from the arm 66, is an arm 69, having a slot 70 in its outer end which engages with the rim 46 of the disk 45. Also integral with the arm 66 is an extension portion 71, which is connected as by a pin 72, connecting rod 73 and pin 74 with the piston 75 of an air cylinder 76, which acts as a dash pot to damp the movement of the pendulum 65.

80 is a vertical line on the indicator casing 11, and 81 is a horizontal line, forming datum lines to which the position of the indicator 12 and its parts may be referred.

It will be noted that the vertical, fore and aft, and transverse axes about which the indicator is moved, intersect in a common point, substantially in the center of gravity of the indicator so that no shift is made of the center of movement of the indicator away from the center indicated by the intersecting-lines 80 and 81, and movement of the indicator directly reflects what is taking place.

In the above description the details of the actuating mechanisms contained in the casings 50 and 53 have been purposely omitted, since they form no part of the present invention.

In the use of the device the indicator 12 is preferably disposed about at the level of the eye of the operator of the plane. With the plane flying straight ahead and on level keel, the fin 16, pin 18 and the body of the indicator 12 are in alignment with the vertical indicating or datum line 80. The indicator tail 14 and the wings 17 are level with the horizontal indicating datum line 81 and the wings 15 are coincident with the line 81 throughout their length.

Should the airplane start to turn, the turn-mechanism within the casing 50 will oscillate the shaft 51 to right or left in the same direction as and in proportion to the amount of the turn being made. The oscillation of the shaft 51 acting through the gears 52 and 49 will similarly oscillate the shaft 17 and the indicator 12 mounted thereon, the shaft oscillating about the pivot pins 18, 20, as upper and lower centers at absolute minimum of friction. Should it be desired to increase the amount of the oscillation of the shaft or decrease such amount of oscillation the size of the gear 49 relative to the size of the gear 52 may be decreased or increased, as may be found necessary. As the shaft 17 oscillates the indicator 12 will be swung to right or left, thus pointing to the right or left of the vertical datum line 80 and directly indicating the direction of turn and the relative amount thereof. In oscillating, the shaft necessarily carries with it the rods 40 and 43 therewithin and the disks 45 and 47 secured to these rods respectively. The turning movement of these disks move their respective arcuate rims 46, 48 in the slots 70

70, 62 of the arms 69, 58, without effect on such arms and without changing the position of the rims with reference to the lengths of the slots, though of course shifting these rims to bring other portions thereof into the slots.

It will be noted here with respect to the foregoing indicator movements, and also with respect to the following movements, that the miniature plane forming the indicator is turned relatively to the datum lines 80, 81, in identically the same manner in which the air plane itself turns with regard to the desired direction line and the horizon, and that the miniature plane therefore pictures to the aviator exactly what he would see if these same positions of the airplane relative to the earth were the earth at that time visible.

Should the airplane begin to bank, as with the left wing up and the right wing down, the pendulum 65 would gravitate to the right, raising the end of the arm 69, and through the engagement of such slotted end with the rim 46, raising the disk 45, rod 40, and through the rod 40 the pin 37, which is over the center of the shaft. Raising the pin 37 raises the end of the stem of the arm 33 about its pivot centers 32; thus raising the pin 35 and laterally tilting the frame 30 and correspondingly tilting the indicator to move one wing 15 up and the other wing 15 down in direct proportion to the banking of the airplane.

It will be noted that the pins 29 engaging the shaft 17 prevent the lateral tilting of the rocker which carries the pins 32; and also that the action of the rod 40 being directly in the center of the shaft establishes no fore and aft tilting strain in the rocker.

Should the airplane nose down or up, the mechanism in the casing 53 tend to move the exposed surfaces of the member 54 downward or upward, as the case might be, and through the arm 57 correspondingly depress the free end of the arm 58, or raise same, and thereby lower or raise the disk 47 and through the rod 43 would depress or raise the nose 13 of the indicator, this movement being about the pivot pins 29, which engage the sides of the tube 17. Movement of this kind would not be interfered with by the rod 40 and its connection to the pin 37, since the yoke connection permits free movement either laterally or longitudinally of the indicator.

Any one of the foregoing motions may take place independently of any other motion, and on the other hand all three actions may take place at one and the same time; in which latter case the indicator would indicate a turn, bank and either a dive or climb, and the combined action, or thing which is happening to the airplane would be visually impressed by the indicator on the operator of the airplane and in such manner that his responsive action to correct the unwonted conditions would be such as he would naturally take, were the earth visible and he could see just what the airplane was doing.

It will be understood that in a correctly banked turn the instrument indicates the turn only and properly does not show the bank. However, should the amount of bank be incorrect for the turn being made, such error would be indicated.

What I claim is:

1. In an indicator for an airplane having an instrument board, a hollow shaft vertically disposed and rotatably carried by said board, a normally horizontal rocker pivotally supported on said shaft about normally horizontal axis adjacent the upper end of said shaft, a normally horizontal frame disposed around said rocker; means establishing normally horizontal pivotal connection between said rocker and said frame at right angles to the first said pivotal means; an indicator secured on and movable with said frame, said indicator simulating an airplane in miniature, connecting means hinged to a side of said rocker at a point laterally offset from the second said pivotal means, mechanism responsive to the turning of said airplane mounted on said board; means operably connecting said shaft with said turn-responsive mechanism; means mounted on said board responsive to banking movement of said airplane, means operably connecting said bank-responsive means with said connecting means to effect oscillating movement of said frame and indicator about its longitudinal axis; means carried by said board responsive to the pitch of said airplane; means connecting said pitch-responsive means to said indicator at a point offset from said first pivotal means; said latter connecting means being effective to oscillate said rocker, frame and indicator about said laterally disposed pins.

2. In an indicator for an airplane, a shaft, vertically disposed and rotatably carried by said plane, a rocker, means establishing normally horizontal pivotal connection between said rocker and said shaft; a member, means establishing normally horizontal pivotal connection between said rocker and said member, at right angles to said first pivotal connection, an indicator, means connecting said indicator to said member; turn-responsive means carried by said plane, means operably connecting said shaft with said turn-responsive means; bank-responsive means carried by said plane and responsive to improperly executed banking of said plane, means connecting said bank-responsive means with said rocker at a point laterally offset from the second said pivotal means, to effect oscillating movement of said indicator about its longitudinal axis, pitch-responsive means carried by said plane, and means connecting said pitch-responsive means to said rocker at a point offset from said first pivotal means to oscillate said indicator about said laterally disposed pins.

3. In an airplane having turn-responsive, bank-responsive, and pitch-responsive mechanisms, a movable indicator visible to the pilot and having a material structure of three indicating dimensions, a mounting for said indicator, including a turnable vertical member, and means movable connecting said indicator to said member; said means including a rocker pivoted to said vertical member on a transverse axis, and a frame pivoted to said rocker on a longitudinal axis, the axes of said vertical member, and said transverse and longitudinal pivots being mutually normal and substantially intersecting; said indicator being secured to said frame, with its center adjacent said axes center; means turnably connecting said turn-responsive mechanism to said vertical member; means operatively connecting said bank-responsive mechanism to a side of said frame, and means operatively connecting said pitch-responsive mechanism to an end of said frame.

4. In an airplane, having turn-responsive, bank-responsive, and pitch-responsive mechanisms; a movable indicator and fixed related datum-indicia, both mounted on said airplane, said indicator being visible to the pilot and having three indicating dimensions; said indicator mounting including a turnable vertical member, and means movably connecting said indicator to said member; said means including a rocker pivoted to said vertical member on a transverse axis, and a frame pivoted to said rocker on a longitudinal axis, the axes of said vertical member, and all of said pivots being mutually normal and substantially intersecting, said indicator being secured to said frame with its center adjacent the intersection of said axes; means turnably connecting said turn-responsive mechanism to said vertical member; means operatively connecting said bank-responsive mechanism to a side of said frame, and means operatively connecting said pitch-responsive mechanism to an end of said frame.

5. Airplane indicator means, including turn-responsive, pitch-responsive, and bank-responsive mechanisms carried by said plane, an indicator which simulates an airplane in miniature, and a mounting therefor which includes a vertically disposed shaft having its axis passing through the intersection of the longitudinal and a transverse axis of said indicator, pivot means fixedly carried by said plane respectively journalling said shaft above and below said intersecting axes, and means actuatably coupling said shaft and said turn-responsive mechanism; a rocker, substantially surrounding said shaft said rocker having transversely disposed ends, and relatively depressed sides, said sides having central bosses projecting upward substantially to the level of said ends, and a pair of pivot pins carried by said bosses, said pins being axially aligned with said transverse axis and respectively pivotally engaging opposite sides of said shaft, a rocker-pin carried by said rocker, said pin being parallel with and spaced from said transverse axis, and means coupling said rocker-pin with said pitch-responsive mechanism; a frame surrounding said rocker and carrying said indicator, pivot pins carried by said frame, said pins being axially aligned with said longitudinal axis and respectively pivotally engaging said front and rear ends of said rocker, an L-member disposed between said rocker ends, a pair of aligned pivot pins carried by said rocker, said pins being laterally offset from said longitudinal axis and pivotally engaging the opposite ends of the base of said L, the leg of said L extending along an end of said rocker and therebeyond, a pin spaced laterally beyond said longitudinal axis from said pivot pins, carried by said frame and journalled in said extending leg, an actuating pin carried by said leg and extending therefrom substantially along said longitudinal axis, and means actuatably coupling said actuating pin and said bank-responsive mechanism.

6. Airplane indicator means, including turn-responsive, pitch-responsive and bank-responsive mechanisms carried by said plane, an indicator having three indicating dimensions, and a mounting therefor which includes a vertically disposed shaft having its axis passing through the intersection of the longitudinal and transverse axes of said indicator; pivot means fixedly carried by said plane respectively journalling said shaft above and below said intersecting axes, and means actuatably coupling said shaft and said turn-responsive mechanism; a rocker substantially surrounding said shaft, a pair of pivot pins carried by the opposite sides of said rocker, said pins being axially aligned with said transverse axis and respectively pivotally engaging opposite sides of said shaft, a rocker-pin carried by said rocker, said pin being parallel with and spaced from said transverse axis, and means actuatably coupling said rocker-pin with said pitch-responsive mechanism; a frame surrounding said rocker and carrying said indicator, pivot pins carried by said frame, said pins being axially aligned with said longitudinal axis and respectively pivotally engaging the front and rear ends of said rocker, an L-member disposed between said rocker ends, a pair of aligned pivot pins carried by said rocker, said pins being laterally offset from said longitudinal axis and pivotally engaging the opposite ends of the base of said L, the leg of said L extending along an end of said rocker and therebeyond, a pin spaced laterally beyond said longitudinal axis from said pivot pins, carried by said frame and journalled in said extending leg, an actuating pin carried by said leg and extending therefrom substantially along said longitudinal axis, and means actuatably coupling said actuating pin and said bank-responsive mechanism.

7. Airplane indicator means, including turn-responsive, pitch-responsive, and bank-responsive mechanisms carried by said plane, an indicator which simulates an airplane in miniature, and a mounting therefor which includes a vertically disposed shaft having its axis passing through the intersection of the longitudinal and a transverse axis of said indicator; pivot means fixedly carried by said plane respectively journalling opposite ends of said shaft, and means actuatably coupling said shaft and said turn-responsive mechanism; a rocker substantially surrounding said shaft, a pair of pivot pins carried by the opposite sides of said rocker, said pins being axially aligned with said transverse axis and respectively pivotally engaging opposite sides of said shaft, a rocker-pin carried by said rocker, said pin being parallel with and spaced from said transverse axis, and means actuatably coupling said rocker-pin with said pitch-responsive mechanism; pivot pins carried by said indicator, said pins being axially aligned with said longitudinal axis and respectively pivotally engaging the front and rear ends of said rocker, an L-member disposed between said rocker ends, a pair of aligned pivot pins carried by said rocker, said pins being laterally offset from said longitudinal axis and pivotally engaging the opposite ends of the base of said L, the leg of said L extending along an end of said rocker and therebeyond, a pin, laterally offset from and parallel with said longitudinal axis, carried by said indicator and journalled in said extending leg, an actuating pin carried by said leg and extending therefrom substantially along said longitudinal axis, and means actuatably coupling said actuating pin and said bank-responsive mechanism.

8. In an indicator for an airplane, a shaft, vertically disposed and carried by said plane, a rocker means establishing normally horizontal pivotal connection between said rocker and said shaft; a member, means establishing normally horizontal pivotal connection between said rocker and said member, at right angles to said first pivotal connection, an indicator, means connecting said indicator to said member; means carried by said plane and responsive to improper banking of said plane, means connecting said bank-responsive means with said rocker at a point laterally off-set from the second said pivotal means, to effect oscillating movement of said indicator about its longitudinual axis, pitch-responsive means carried by said plane, and means connecting said pitch-responsive means to said rocker at a point off-set from said first pivotal means to oscillate said indicator about said laterally disposed pins.

9. In an airplane having bank-responsive, and pitch-responsive mechanisms, a movable indicator visible to the pilot and having a material structure of three indicating dimensions, a mounting for said indicator, including a vertical member; and means movable connecting said indicator to said member; said means including a rocker pivoted to said member on a transverse axis, and a frame pivoted to said rocker on a longitudinal axis, the axes of said transverse and longitudinal pivots being mutually normal and substantially intersecting; said indicator being secured to said frame, with its center adjacent said axes center; means operatively connecting said bank-responsive mechanism to a side of said frame, and means operatively connecting said pitch-responsive mechanism to an end of said frame.

10. In an airplane, having bank-responsive, and pitch-responsive mechanisms; a movable indicator and fixed related datum-indicia, both mounted on said airplane, said indicator being visible to the pilot, said indicator mounting including a vertical member, and means movably connecting said indicator to said member; said means including a rocker pivoted to said vertical member on a transverse axis, and a frame pivoted to said rocker on a longitudinal axis, the axes of said pivots being mutually normal and substantially intersecting, said indicator being secured to said frame with its center adjacent the intersection of said axes; means operatively connecting said bank-responsive mechanism to a side of said frame, and means operatively connecting said pitch-responsive mechanism to an end of said frame.

HARRY L. McPHERSON.